US008141370B2

(12) United States Patent
Bulman et al.

(10) Patent No.: US 8,141,370 B2
(45) Date of Patent: Mar. 27, 2012

(54) METHODS AND APPARATUS FOR RADIALLY COMPLIANT COMPONENT MOUNTING

(75) Inventors: David Edward Bulman, Cincinnati, OH (US); Toby George Darkins, Jr., Loveland, OH (US); James Anthony Stumpf, Columbus, IN (US); Mark S. Schroder, Greenville, SC (US); John Joseph Lipinski, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1273 days.

(21) Appl. No.: 11/463,142

(22) Filed: Aug. 8, 2006

(65) Prior Publication Data

US 2008/0034759 A1    Feb. 14, 2008

(51) Int. Cl.
F02C 7/20    (2006.01)

(52) U.S. Cl. .................................. 60/796; 60/752

(58) Field of Classification Search ............ 60/752–760, 60/796–800
See application file for complete search history.

(56) References Cited

U.S. PATENT DOCUMENTS

| 2,615,300 | A | * | 10/1952 | Lombard | 60/800 |
|---|---|---|---|---|---|
| 4,413,470 | A | * | 11/1983 | Scheihing et al. | 60/800 |
| 4,413,477 | A | * | 11/1983 | Dean et al. | 60/757 |
| 4,944,151 | A | * | 7/1990 | Hovnanian | 60/800 |
| 5,291,732 | A | * | 3/1994 | Halila | 60/796 |
| 6,397,603 | B1 | | 6/2002 | Edmondson et al. | |
| 6,662,568 | B2 | | 12/2003 | Shimizu et al. | |
| 6,758,653 | B2 | | 7/2004 | Morrison | |
| 6,895,757 | B2 | | 5/2005 | Mitchell et al. | |
| 6,895,761 | B2 | | 5/2005 | Mitchell et al. | |
| 6,904,757 | B2 | | 6/2005 | Mitchell et al. | |
| 6,920,762 | B2 | | 7/2005 | Wells et al. | |
| 7,546,743 | B2 | * | 6/2009 | Bulman et al. | 60/796 |
| 2004/0118122 | A1 | | 6/2004 | Mitchell et al. | |
| 2004/0118127 | A1 | | 6/2004 | Mitchell et al. | |
| 2004/0154303 | A1 | | 8/2004 | Mitchell et al. | |
| 2004/0255597 | A1 | * | 12/2004 | Glessner et al. | 60/796 |
| 2005/0050902 | A1 | * | 3/2005 | Anichini et al. | 60/800 |
| 2005/0072163 | A1 | | 4/2005 | Wells et al. | |
| 2006/0059918 | A1 | * | 3/2006 | Caldwell et al. | 60/772 |
| 2006/0101827 | A1 | * | 5/2006 | Ryan et al. | 60/796 |

(Continued)

FOREIGN PATENT DOCUMENTS

GB    1539035 A    1/1979

(Continued)

OTHER PUBLICATIONS

State Intellectual Property Office, P.R. China Foreign Search Report dated Feb. 5, 2010 for Application No. 2007101102799.

(Continued)

*Primary Examiner* — William H Rodriguez
*Assistant Examiner* — Phutthiwat Wongwian
(74) *Attorney, Agent, or Firm* — Armstrong Teasdale LLP

(57) ABSTRACT

Methods and apparatus for a mounting assembly for a liner of a gas turbine engine combustor are provided. The combustor includes a combustor liner and a radially outer annular flow sleeve. The mounting assembly includes an inner ring surrounding a radially outer surface of the liner and including a plurality of axially extending fingers. The mounting assembly also includes a radially outer ring coupled to the inner ring through a plurality of spacers that extend radially from a radially outer surface of the inner ring to the outer ring.

14 Claims, 3 Drawing Sheets

U.S. PATENT DOCUMENTS

| | | | |
|---|---|---|---|
| 2006/0168965 A1* | 8/2006 | Green et al. | 60/752 |
| 2006/0242965 A1* | 11/2006 | Shi et al. | 60/796 |
| 2007/0240423 A1 | 10/2007 | Bulman et al. | |

FOREIGN PATENT DOCUMENTS

| | | | |
|---|---|---|---|
| JP | 52156213 A | 6/1977 | |
| JP | 53120674 | 9/1978 | |
| JP | 57164316 | 10/1982 | |
| JP | 2003083088 A | 3/2003 | |
| JP | 2005077090 A | 3/2005 | |
| JP | 2006002764 A | 1/2006 | |
| JP | 2006003072 A | 1/2006 | |
| JP | 2006308279 A | 11/2006 | |

OTHER PUBLICATIONS

Japanese Office Action; Application No. 2007-149908; dated Oct. 27, 2011; pp. 5.

* cited by examiner

METHODS AND APPARATUS FOR RADIALLY COMPLIANT COMPONENT MOUNTING

STATEMENT REGARDING FEDERALLY SPONSORED RESEARCH & DEVELOPMENT

The invention described herein was made in the performance of work under DOE Case No. S-110,587—Disclosure No. 164632—Contract No. DE-FC26-00CH11047, currently administered by the Department of Energy.

BACKGROUND OF THE INVENTION

This invention relates generally to the use of ceramic matrix composite (CMC) liners in a gas turbine engine combustor and more particularly, to the mounting of such CMC liners to a support member of the combustor so as to accommodate differences in radial, circumferential, and axial growth.

Advanced gas turbine engine development use certain ceramic materials having a higher temperature capability than the metallic type materials currently in use for high temperature applications such as combustor liners. One specific class of such non-metallic low thermal expansion materials is ceramic matrix composite (CMC) materials which can operate at significantly higher temperatures than metals and would allow reduced cooling requirements that can be translated into increased engine efficiency and output. With its higher temperature capability, CMC materials greatly reduce the required cooling effectiveness and can simultaneously allow a reduction in the combustor pressure drop by deleting convection cooling enhancement features called turbulators. Using CMC material for the combustor liner facilitates increasing the net power output of gas turbine. However, to realize the benefit of operating the CMC liner material at higher temperatures there is a need for new methods of mounting CMC liners that can accommodate the low coefficient of thermal expansion of the CMC material, as well as the relatively low strain to failure of CMCs relative to conventional metallic materials.

BRIEF DESCRIPTION OF THE INVENTION

In one embodiment, a mounting assembly for a liner of a gas turbine engine combustor includes an inner ring surrounding a radially outer surface of the liner and including a plurality of axially extending fingers. The mounting assembly also includes a radially outer ring coupled to the inner ring through a plurality of spacers that extend radially from a radially outer surface of the inner ring to the outer ring In another embodiment, a method of assembling a gas turbine engine assembly includes providing a combustor liner for the gas turbine engine assembly, coupling the liner to an inner ring, the inner ring extending circumferentially about an outer surface of the combustor liner, the inner ring coupled to a substantially concentric outer ring spaced radially outwardly from the inner ring using a plurality of radially outwardly extending spacers, and coupling the outer ring to an annular flow sleeve at least partially surrounding the combustor liner.

In yet another embodiment, a gas turbine engine includes a compressor coupled to a shaft, a turbine coupled to the shaft, and a plurality of combustors arranged in an annular array about the gas turbine engine shaft. Each combustor includes an outer casing, a flow sleeve positioned radially within the outer casing, a combustion liner positioned radially within the flow sleeve wherein the liner includes a ceramic matrix composite (CMC), and a mounting assembly for the liner. The mounting assembly includes an inner ring surrounding a radially outer surface of the liner, the inner ring including a plurality of axially extending fingers, and a radially outer ring coupled to the inner ring through a plurality of spacers that extend radially from a radially outer surface of the inner ring to the outer ring.

DETAILED DESCRIPTION OF THE INVENTION

Figure 1:
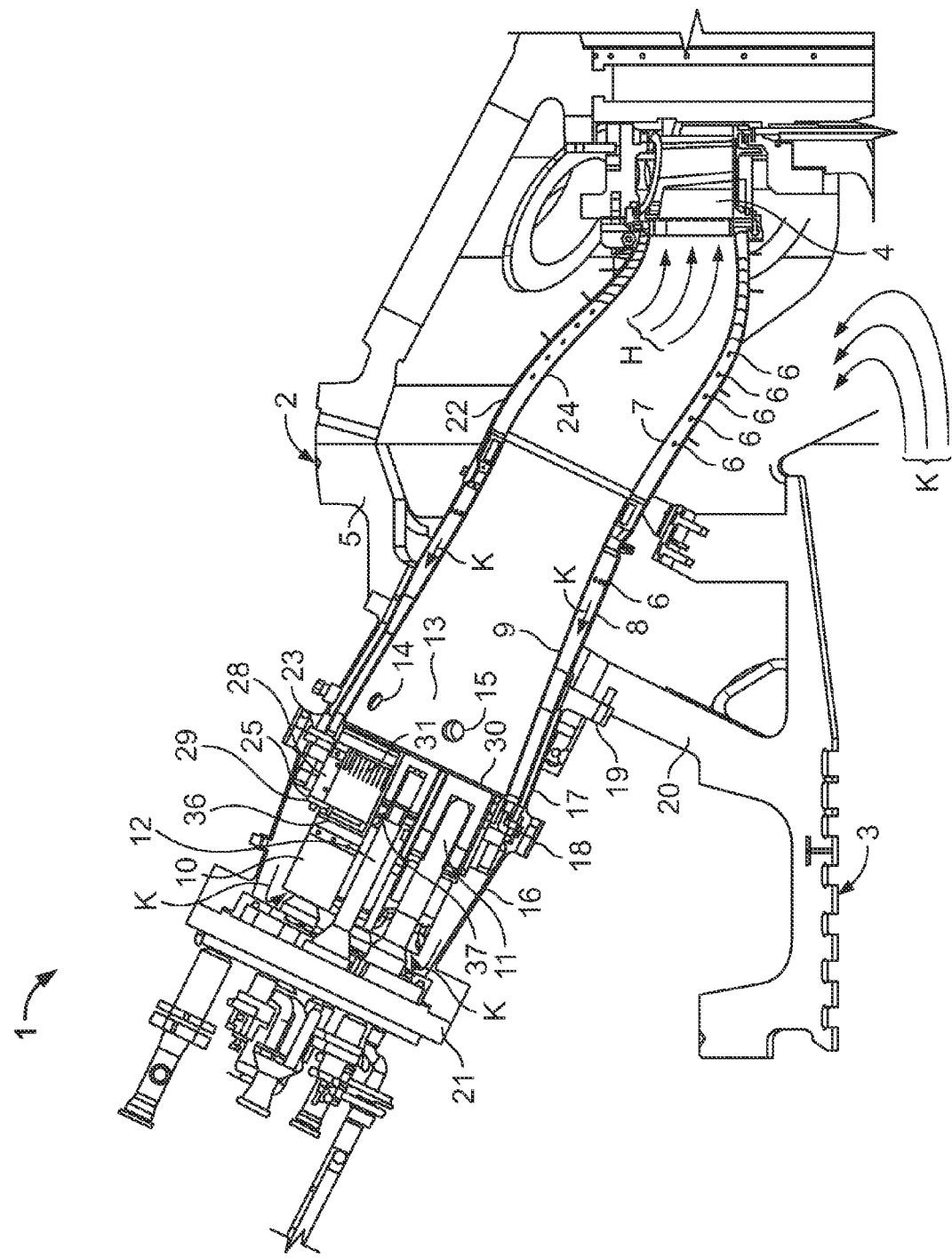
FIG. 1 is a partial cross section of a gas turbine combustor of a gas turbine engine system in accordance with an exemplary embodiment of the present invention.

FIG. 1 is a partial cross section of a gas turbine combustor 1 of a gas turbine engine system 2 in accordance with an exemplary embodiment of the present invention. Gas turbine engine system 2 includes a plurality of combustors 1 arranged in an annular array about the periphery of a gas turbine casing 5. High pressure air K from a compressor 3 flows into combustors 1 through an array of air inlet holes 6 distributed along a transition piece 7 and a flow sleeve 8 near an outlet end of a combustor liner 9. Compressed air K delivered to combustor 1 flows through an annular passage bounded by combustor flow sleeve 8 and combustor liner 9 to a combustor inlet end (or synonymously, head end) 10 where there are arranged a plurality of air-fuel injectors. For example, in some configurations, the plurality of air-fuel injectors comprise an array of outer fuel nozzles 11 and a center nozzle 12 per combustor 1. Not all configurations have the same number of inner nozzles or the same number of outer nozzles as that described herein. By way of example only, some configurations include more than one center nozzle 12 surrounded by a different number of outer nozzles 11 than that described herein.

At an inlet end of each combustor 1, compressed air and fuel are mixed and flow into a combustion burning zone 13. At the opposite end of combustion burning zone 13, hot combustion gases H flow into double-walled transition piece 7 that couples an outlet end of each combustor liner 9 with an inlet end of a turbine nozzle 4 to deliver hot combustion gas flow H to gas turbine engine system 2, where the enthalpy of the hot gas flow is converted to shaft work in the turbine rotor via the expansion of gas flowing through stationary and rotating turbine airfoils (not shown in the Figures).

Each combustor 1 includes a substantially cylindrical combustion casing assembly comprising two sections, namely, a forward combustion casing 16 and an aft combustion casing 17. Combustion casings 16 and 17 are attached to compressor discharge casing 20 by a bolted joint 19. Forward combustion casing 16 is connected to aft combustion casing 17 by bolted joint 18. The head end of forward combustion casing 16 is closed by an end cover assembly 21 that may also include fuel and air supply tubes, manifolds and associated valves for feeding gas, liquid fuel, air, and water (if desired) to combustor 1.

A substantially cylindrical flow sleeve 8 is concentrically mounted in combustion casings 16 and 17. Flow sleeve 8 connects at its aft end to an outer wall 22 of double walled transition piece 7. Compressor air K flows through an outer passage of double walled transition piece 7, over and through flow sleeve 8, and to the combustor 1 head end 10. Flow sleeve 8 is coupled at its forward end by means of a radial flange 23 to aft combustor casing 17 at bolted joint 18 where forward combustion casing 16 and aft combustion casing 17 are joined.

In the exemplary embodiment, flow sleeve 8 is substantially concentrically arranged with combustor liner 9 that is connected at one end with an inner wall 24 of transition piece 7. Outer wall 22 of transition piece 7, as well as a portion of flow sleeve 8 extending aft of the location at which aft combustion casing 17 is bolted to compressor discharge casing 20, are formed with an array of apertures or inlet holes 6 over their respective peripheral surfaces to permit air to reverse flow from compressor 3 through apertures 6 into the annular space between flow sleeve 8 and combustor liner 9 toward the upstream or head end 10 of combustor 1 (as indicated by the flow arrows K).

Combustion liner cap assembly 25 supports a plurality of pre-mix tube assemblies 28, one mounted concentrically about each fuel nozzle assembly 11 and 12. Each pre-mix tube assembly 28 is supported within combustion liner cap assembly 25 at its forward and aft ends by a forward plate 29 and aft plate 30, respectively, each provided with openings aligned with the open-ended pre-mix tube assemblies 28. Each pre-mix tube assembly 28 comprises an assembly of two tubes separated by a pre-mix tube hula seal 31, which permits the dual-tube assembly to change in length as combustion liner cap assembly 25 expands thermally from cold non-running conditions to hot operating conditions. In other words, as the distance between forward support plate 29 and aft support plate 30 changes due to thermal expansion of the overall assembly, the pre-mix tube assemblies 28 are free to expand accordingly along an axis of symmetry.

Aft plate 30 of combustion liner cap assembly 25 mounts to a plurality of forwardly extending floating collars 36 (one for each pre-mix tube assembly 28, arranged in substantial alignment with the openings in aft plate 30), each of which supports an air swirler 37 (also referred to herein as a "swirling vane") which is, for example, integrally formed in fuel nozzles 11 and 12 (also referred to herein as "fuel injection nozzles," "fuel injectors," or "fuel nozzle assemblies"). The arrangement is such that air flowing in the annular space between combustor liner 9 and flow sleeve 8 is forced to reverse direction at combustor inlet end 10 of combustor 1 (between end cover assembly 21 and combustion liner cap assembly 25) and to flow through air swirlers 37 and pre-mix tube assemblies 28. Fuel passages integrally manufactured into each of air swirlers 37 deliver fuel through an arrangement of apertures that continuously introduce gas fuel, depending upon the operational mode of gas turbine engine assembly 10 into the passing air, thereby creating a fuel and air mixture that is subsequently and continuously ignited in combustion burning zone 13.

Figure 2:
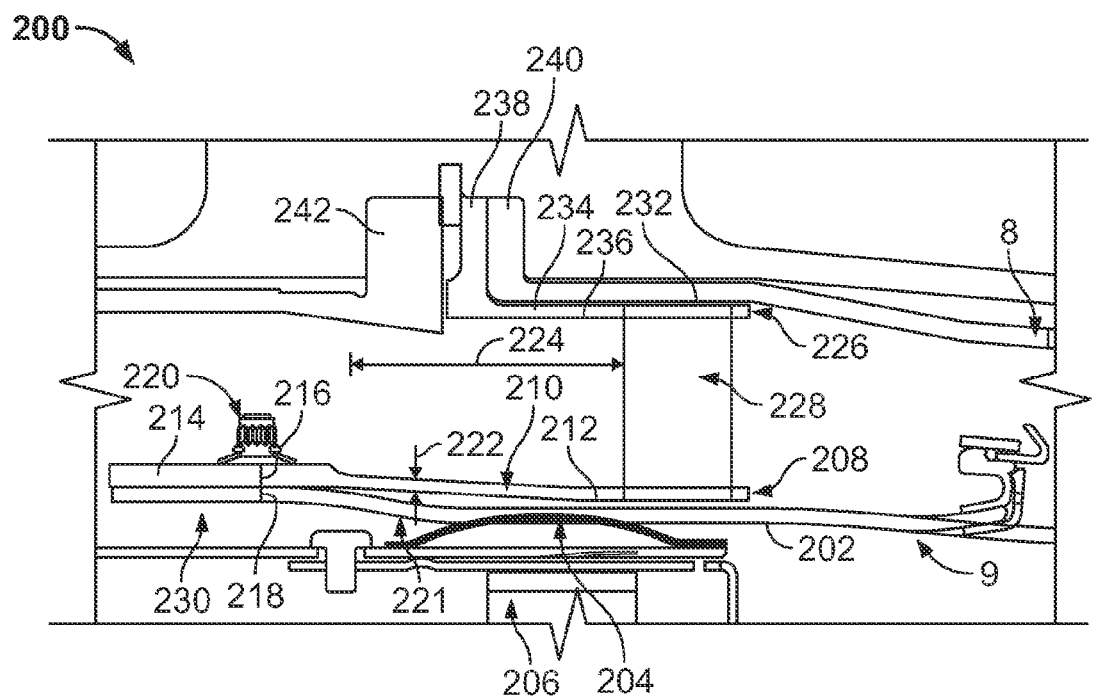
FIG. 2 is an enlarged view of a portion of an attachment assembly for supporting a forward end of the liner shown in FIG. 1.

FIG. 2 is an enlarged view of a portion of an attachment assembly 200 for supporting a forward end of liner 9. In the exemplary embodiment, when fabricated liner 9 comprises a CMC material. The challenge in using CMC material for combustor liners is developing the interfaces to existing metal hardware in a cost effective system that meets life and cost requirements. The herein described assembly facilitates the use of CMC materials for the combustor liners by employing a Radially Compliant Mounting.

CMC materials have mechanical properties that are carefully considered during design and application of an article such as combustor liner 9, which must interface with metallic hardware of significantly higher strength and higher thermal expansion characteristics. The higher temperature capability CMC materials are supported by, and sealed to, metallic components in a gas turbine combustion system. For metal liners, attachment features are readily joined to a metallic liner by brazing, welding, staking or other well developed and reliable joining methods. The attachment features provide support for cylindrical liners in the radial, axial and tangential directions. The herein described fabrication methods for CMC demonstrate a capability to incorporate complex or intricate mounting features that are structurally acceptable for gas turbine applications.

At least some known CMC type materials have a coefficient of thermal expansion (CTE) in the range of 1.5-3.5 microinch/inch/° F., significantly different from commercial high temperature metal alloys used in combustor liners and restraining supports or hangers which typically have a CTE in the range of about 7-10 microinch/inch/° F. In addition to low coefficient of thermal expansion, CMC type materials also have relatively low tensile ductility resulting from low strain to failure when compared with metallic materials.

Generally, commercially available CMC materials include a ceramic type fiber, for example SiC, forms of which are coated with a compliant material such as BN. The fibers are carried in a ceramic type matrix, one form of which is SiC. Typically, CMC type materials have a room temperature tensile ductility of no greater than about 1%, herein used to define and mean a low ductility material. Generally, CMC type materials have a room temperature tensile ductility in the range of about 0.4-0.7%. This is compared with metallic liners and/or supporting structures or hanger materials having a room temperature tensile ductility of at least between 5%-15%.

Attachment assembly 200 provides radial, tangential, and axial support for CMC liner 9, which may be a cylindrical/conical section as shown in FIG. 2. Liner 9 is substantially centered from a radially inner surface 202 at installation by a hula seal 204 on both the forward end 206 of liner 9 and an aft end (not shown) of liner 9. Attachment assembly 200 reacts the pressure loads on liner 9 that create a net load forward on liner 9 along a cylindrical axis (not shown in FIG. 2) of liner 9.

Attachment assembly 200 includes a radially inner ring 208 that surrounds forward end 206 of liner 9. Inner ring 208 includes a plurality of forwardly extending fingers 210 that are spaced circumferentially about a forward edge 212 of inner ring 208. At a distal end 214 of each finger 210, an aperture 216 aligns with a complementary aperture 218 in liner 9 to receive a fastener 220. Proximate fastener 220, liner 9 is stepped radially outward at an axial point 221 to permit clearance during assembly.

Fingers 210 are sized in thickness 222 and length 224 to be able to support the axial loads resulting from the differential pressure on liner 9 while allowing fingers 210 to deflect radially to accommodate the difference in thermal growth of the low CTE CMC liner 9 and the higher CTE metal inner ring 208 that couple to a radially outer ring 226 by a plurality of spacers 228. The plurality of fingers 210 rigidly attach to CMC liner 9 using a bolt head 230 that matches a radially inner surface contour of CMC liner 9. The configuration of fastener 220 substantially eliminates the need for spot facing CMC liner 9 which could create a failure initiation site. The weight of CMC combustor liner 9 is carried by hula seals 204 that center liner 9 on forward end 214 and the aft end of cylindrical liner 9. Because of the centering by seals 204 outer ring 226 a radial clearance 232 is maintained between flow sleeve 8 and liner 9. Liner 9 axial pressure load is carried positively in friction by the configuration of clamped fastener 220 that is not susceptible to wear in the high vibration environment of gas turbine engine system 2. The axial load of liner 9 is transmitted through spacers 228 to outer ring 226. Outer ring 226 includes a forward extension 234 that extends axially from a forward edge 236 of outer ring 226. A distal end of forward extension 234 is coupled to an outwardly extending flange 238 that is configured to couple to a flange 240 of flow sleeve 8 and a flange 242 of forward combustion casing 16.

In the exemplary embodiment, the clamped joint configuration of fastener 220 utilizes a combination of metals to compensate for the low CTE of the CMC liner to maintain clamp at elevated operating temperatures to carry all normal operating loads in friction by fastener 220 clamp. The clamped joint is executed in the cooled, low stress area of liner 9 at temperatures substantially within the material limitations of metallic components, specifically for the bolt and nut comprising fastener 220 in this embodiment.

In the exemplary embodiment, attachment assembly 200 provides for distribution of the axial pressure load at ten times the number of locations as in previous designs. For example, in the exemplary embodiment, the number of fingers 210 is thirty-two, as compared to previous designs, which included only three discrete lugs. The quantity of radial spacers is exactly half of the number of fingers.

Such arrangement uniformly loads each finger to enable the symmetric bolted joint configuration to carry a relatively smaller portion of the axial load in friction for excellent durability in a gas turbine environment. A non-symmetric design would have to account for an axial load peaking factor into some of the fingers and/or bolts. In the exemplary embodiment, fingers 210 and inner ring 208 are fabricated from similar materials with a high CTE, such as A286 stainless steel. However, the high CTE, A286, results in a larger radial mismatch between inner ring 208 and the low CTE CMC liner 9. In an alternative embodiment, inner ring 208 and fingers 210 are fabricated as a bimetallic component such that ring 208 and fingers 210 comprise materials with different CTE than each other. For example, a bimetallic inner ring 208 of low CTE like AISI 410 stainless steel with high CTE A286 metallic fingers 210 for clamp retention in the bolted joint provides a relatively smaller thermal mismatch radially at operating temperature between inner ring 208 and liner 9. This specific alternative would result in approximately one half of the radial mismatch between CMC liner 9 and inner ring 208.

Figure 3:
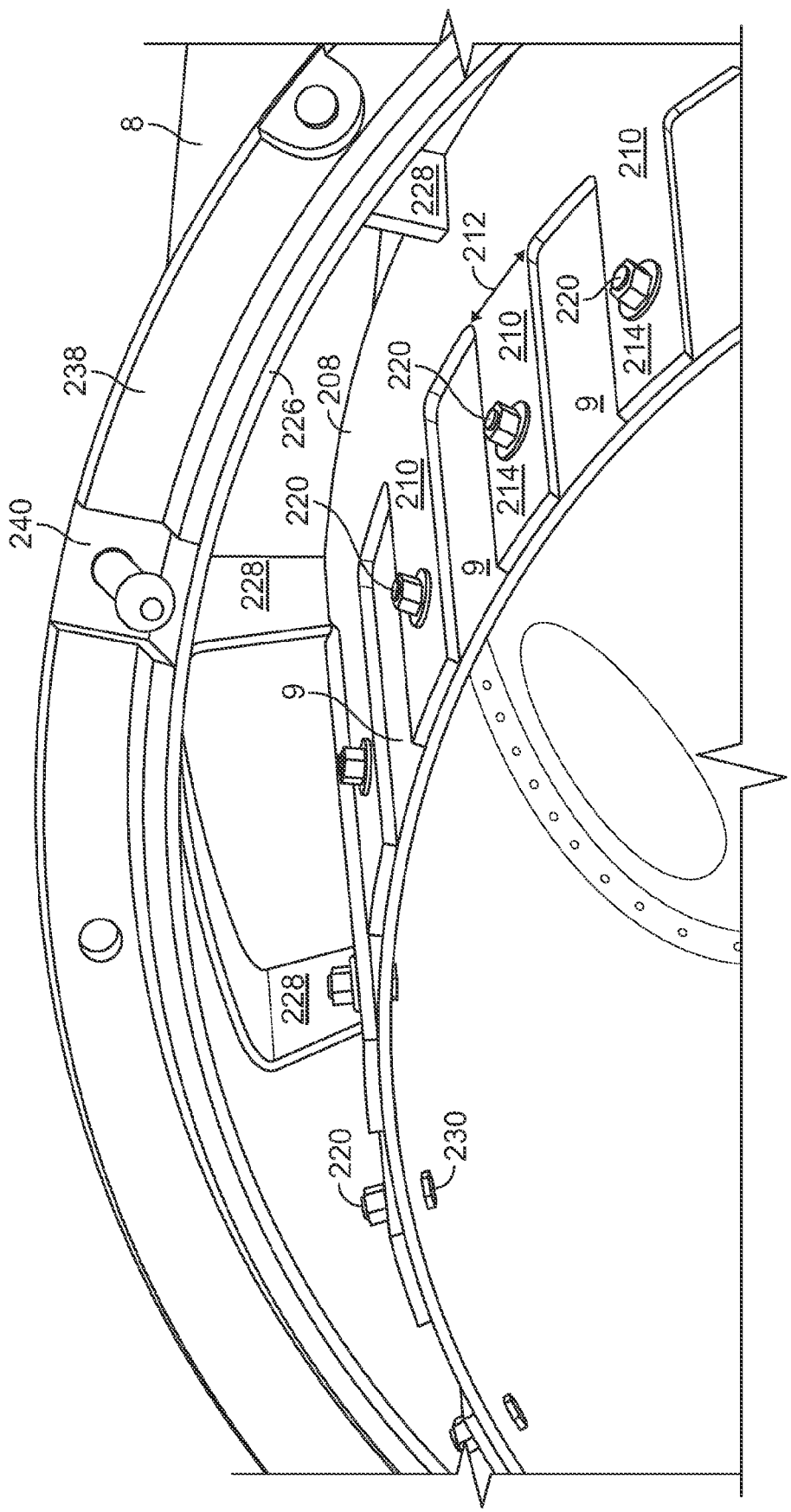
FIG. 3 is a perspective view of the attachment assembly shown in FIG. 2.

FIG. 3 is a perspective view of attachment assembly 200 shown in FIG. 2. In the exemplary embodiment, liner 9 is clamped to fingers 210 using fasteners 220. Fingers 210 are coupled to inner ring 208 or may be formed unitarily with inner ring 208. The axial load of liner 9 is transmitted through fingers 210 to inner ring 208 and to outer ring 226 through spacers 228. The axial load is then transmitted to flange 238 from spacers 228.

Attachment assembly 200 provides for uniform loading into thirty-two fasteners that react CMC liner 9 pressure loads into combustor case flange 240. In this exemplary embodiment, attachment assembly 200 includes eight 2 legged spacers to support inner ring 208 from outer ring 226 that fits concentrically inside flow sleeve 8.

The above-described radially compliant forward attachment assembly is cost-effective and highly reliable. The assembly creates a radial compliant forward mounting for the CMC liner to concentrically mount the liner within the flow sleeve and outside of the combustor dome. The flow sleeve delivers cooling flow from the aft end of the liner along the outside of the liner. The convective cooling air flows forward over the backside convective of the smooth CMC liner to maintain the liner within its temperature limits. Accordingly, the radially compliant forward attachment assembly facilitates operation of gas turbine engines in a cost-effective and reliable manner.

Exemplary embodiments of radially compliant forward attachment assembly components are described above in detail. The components are not limited to the specific embodiments described herein, but rather, components of each assembly may be utilized independently and separately from other components described herein. Each radially compliant forward attachment assembly component can also be used in combination with other radially compliant forward attachment assembly components.

While the invention has been described in terms of various specific embodiments, those skilled in the art will recognize that the invention can be practiced with modification within the spirit and scope of the claims.

What is claimed is:

1. A mounting assembly for a liner of a gas turbine engine combustor, the combustor including a combustion casing, combustor liner positioned within the combustion casing, and a radially outer annular flow sleeve spaced radially outwardly, from the combustor liner, said mounting assembly comprising:
   an inner ring surrounding a radially outer surface of the combustor liner, said inner ring comprising a plurality of axially extending fingers;
   a radially outer ring coupled to said inner ring through a plurality of spacers that extend radially from a radially outer surface of said inner ring to said outer ring, said radially outer ring comprising a forward edge extending outwardly from said plurality of spacers, and a flange extending radially outwardly from said forward edge, said flange is coupled to the annular flow sleeve and to the combustion casing; and
   at least one clamping fastener coupling said plurality of axially extending fingers to the combustor liner, said at least one clamping fastener comprises a bolt head that has a surface contour that is shaped complementary to a contour of the combustor liner radially outer surface.

2. An assembly in accordance with claim 1 wherein the combustion casing includes a forward combustion casing coupled to an aft combustion casing, and a flange extending outwardly from the forward combustion casing, said radially outer ring flange is adapted to be coupled to the combustion casing flange.

3. An assembly in accordance with claim 1 wherein said plurality of axially extending fingers are circumferentially spaced about a forward edge of said inner ring.

4. An assembly in accordance with claim 1 wherein said plurality of axially extending fingers comprise a first material, said inner ring comprises a second material wherein said first material is different than said second material.

5. An assembly in accordance with claim 1, wherein said plurality of axially extending fingers comprise a first material, said inner ring comprises a second material wherein a coefficient of thermal expansion of the first material is greater than a coefficient of thermal expansion of the second material.

6. An assembly in accordance with claim 1 wherein said fastener comprises a plurality of metals configured to compensate for a difference in thermal growth between the liner and said inner ring such that a clamp force induced by said fastener is maintained at elevated operating temperatures.

7. An assembly in accordance with claim 1 wherein said plurality of axially extending fingers are sized in thickness and length such that axial loads resulting from a differential pressure across the liner are supported and such that said plurality of axially extending fingers deflect radially to accommodate a difference in thermal growth between the liner and said inner ring.

8. An assembly in accordance with claim 1, wherein a radial outer surface of said radially outer ring and an inner surface of the radially outer annular flow sleeve define a radial clearance gap.

9. An assembly in accordance with claim 1, wherein said radially outwardly extending flange is configured to couple to a complementary flange face coupled to the radially outer annular flow sleeve.

10. A gas turbine engine comprising:
   a compressor;
   a turbine coupled in flow communication with said compressor;
   a gas turbine casing; and
   a plurality of combustors arranged in an annular array about said gas turbine casing, each of said combustors comprising:
      an outer casing;
      a flow sleeve positioned radially within said outer casing;
      a combustor liner positioned radially within said flow sleeve wherein said combustor liner comprises a ceramic matrix composite (CMC); and
      a mounting assembly for said combustor liner comprising:
         an inner ring surrounding a radially outer surface of said combustor liner, said inner ring comprising a plurality of axially extending fingers;
         a radially outer ring coupled to said inner ring through a plurality of spacers that extend radially from a radially outer surface of said inner ring to said outer ring, said radially outer ring comprising a forward edge extending outwardly from said plurality of spacers, and a flange extending radially outwardly from said forward edge, said flange is coupled to said flow sleeve and to said casing; and
      at least one clamping fastener coupling said plurality of axially extending fingers to said combustor liner, said at least one clamping fastener comprising a bolt head having a surface contour that is shaped complementary to a contour of said radially outer surface of said combustor liner.

11. A gas turbine engine in accordance with claim 10, wherein said plurality of axially extending fingers comprise a first material, said inner ring comprises a second material wherein a coefficient of thermal expansion of the first material is greater than a coefficient of thermal expansion of the second material.

12. A gas turbine engine in accordance with claim 10, wherein said at least one clamping fastener comprises a plurality of metals configured to compensate for a difference in thermal growth between said combustor liner and said inner ring such that a clamp force induced by said at least one clamping fastener is maintained at elevated operating temperatures.

13. A gas turbine engine in accordance with claim 10, wherein said plurality of axially extending fingers are sized in thickness and length such that axial loads resulting from a differential pressure across said combustor liner are supported and such that said plurality of axially extending fingers deflect radially to accommodate a difference in thermal growth between said combustor liner and said inner ring.

14. A gas turbine engine in accordance with claim 10, wherein said radially outwardly extending flange is configured to couple to a complementary flange face coupled to said flow sleeve.

* * * * *